United States Patent [19]

Levinson

[11] Patent Number: 4,490,014
[45] Date of Patent: Dec. 25, 1984

[54] LIQUID CRYSTAL DISPLAY WITH LOW CAPACITANCE ZINC OXIDE VARISTOR

[75] Inventor: Lionel M. Levinson, Schenectady, N.Y.

[73] Assignee: General Electric Company, Schenectady, N.Y.

[21] Appl. No.: 233,423

[22] Filed: Feb. 11, 1981

Related U.S. Application Data

[63] Continuation-in-part of Ser. No. 037,873, May 10, 1979, abandoned.

[51] Int. Cl.³ .................. G02F 1/133; H01C 7/10; H01B 1/08; H01L 29/12
[52] U.S. Cl. .................. 350/334; 350/339 R; 338/21; 252/62.3 ZB; 252/518; 427/101; 357/10
[58] Field of Search .................. 350/334, 339 R; 340/765, 784; 338/20, 21; 252/62.3 ZB, 518, 519; 357/10; 427/101

[56] References Cited

U.S. PATENT DOCUMENTS

| | | | |
|---|---|---|---|
| 3,730,607 | 5/1973 | Grabmaier et al. | 350/339 R |
| 3,842,018 | 10/1974 | Ichinose | 357/10 |
| 3,928,245 | 12/1975 | Fishman et al. | 252/518 X |
| 4,040,720 | 8/1977 | York | 350/339 R |
| 4,042,293 | 8/1977 | Hanak et al. | 350/339 R |
| 4,046,847 | 9/1977 | Kresge | 252/519 X |
| 4,233,603 | 11/1980 | Castleberry | 350/333 X |
| 4,374,049 | 2/1983 | Ellis et al. | 338/21 X |

FOREIGN PATENT DOCUMENTS

| | | | |
|---|---|---|---|
| 2752559 | 11/1976 | Fed. Rep. of Germany | 338/21 |
| 9125889 | 12/1974 | Japan | 252/518 |
| 0108294 | 2/1978 | Japan | 252/518 |
| 0071257 | 6/1978 | Japan | 252/518 |

OTHER PUBLICATIONS

Levinson et al, "ZnO Varistors for Transient Protection", *IEEE Transaction Parts, Hybrids and Packaging*, vol. PHP-13, No. 4, Dec. 1977, pp. 338-343.
Matsuoka, "Nonohmic Properties of Zinc Oxide Ceramics", *Japanese Journal of Applied Physics*, vol. 10, No. 6, Jun. 1971, pp. 736-746.
Castleberry (I), "Varistor Controlled Liquid Crystal Display", *Biennial Display Research Conferences*, 1978, pp. 42 & 43.
Castleberry et al. (II), "2"×5" Varistor-Controlled Liquid Crystal Matrix Display", SID 80 Digest, Apr. 1980, pp. 198-199.
Levinson et al. II, "Physics of Metal Oxide Varistors", *Journal of Applied Physics*, vol. 46, No. 3, American Institute of Physics, Mar. 1975, pp. 1332-1341.

*Primary Examiner*—John K. Corbin
*Assistant Examiner*—David Lewis
*Attorney, Agent, or Firm*—Charles E. Bruzga; James C. Davis, Jr.; Marvin Snyder

[57] ABSTRACT

A highly multiplexed liquid crystal display employs nonlinear varistor elements exhibiting a particularly low capacitance value to effectively drive individual liquid crystal cells. Low varistor capacitance is achieved through controlled addition of $Sb_2O_3$ during varistor manufacture.

9 Claims, 4 Drawing Figures

LIQUID CRYSTAL DISPLAY WITH LOW CAPACITANCE ZINC OXIDE VARISTOR

BACKGROUND OF THE INVENTION

This is a continuation-in-part of application Ser. No. 037,873, filed on May 10, 1979 and now abandoned, and is assigned to the same assignee as the instant invention.

This invention relates to highly multiplexed liquid crystal displays and in particular to such displays employing zinc oxide based varistors.

Liquid crystal displays are attractive for a variety of display purposes because of their low power consumption, format versatility, and viewability even in bright light conditions. The display typically operates by applying a pulse of voltage across a portion of optically active material, such as those materials generally considered under the generic term "liquid crystal". Such materials exhibit a varying degree of light transmission, depending upon the voltage applied. Typically, the transmissivity T of the optically active material increases with applied voltage and visual display is more readily effected by providing a reflective electrode at the rear portion of a liquid crystal cell, said cell being one cell in an array used to form alphanumeric or pictorial displays. The front electrodes are preferably transparent to effect proper viewing and may comprise conductive and substantially transparent material such as indium tin oxide. The combination of the front and rear electrodes with the liquid crystal material disposed therebetween acts to provide by capacitive action a certain amount of self-storage capability to maintain the cell in a dark or light configuration for a certain period of time. Beyond this time, a refresh pulse is required to refresh the visual data display. Conventional liquid crystal displays operate with a duty factor of approximately 0.1. Thus, groups of up to ten display elements can be multiplexed by activating a particular cell for one unit of time every ten time units. This is satisfactory for certain applications such as watches and calculators but becomes less desirable as the amount of information to be displayed increases.

It is known that a nonlinear device may be used to control each liquid crystal display cell. Thin film transistors or silicion transistors on a back plate have been used but offer a generally unsatisfactory solution to the drive problem because of their high cost and low yield. Application Ser. No. 961,223 filed Nov. 16, 1978 by Donald E. Castleberry now U.S. Pat. No. 4,233,603, which has been assigned to the same assignee as the present invention, discloses that an unstructured slab of zinc oxide based metal oxide varistor may be employed to effect control over individual liquid crystal cells. Use of such varistor material which also exhibits certain capacitive effects, also permits a high degree of multiplexing to be employed. That is to say, instead of having to be refreshed at every tenth pulse in the refresh cycle, a display employing these metal oxide varistors need only be refreshed at every one-hundredth or one-thousandth pulse in the refresh cycle. A more detailed description of the operation of liquid crystal displays and the use of varistor material to provide nonlinear control means is found in the above-mentioned Castleberry application, and accordingly, it is hereby incorporated herein by reference.

In a liquid crystal display, there are generally a plurality of elements configured in a rectangular array. When varistors are employed to provide the required degree of multiplexing, each element can be considered as a varistor in series with a liquid crystal cell. The varistor material associated with each element exhibits essentially nonlinear resistive characteristics but also has associated with it a parasitic capacitance. The liquid crystal cell exhibits primarily capacitive electrical characteristics in addition to its transmissivity characteristics but the liquid crystal cell also has associated with it an inherent leakage resistance. The leakage resistance is dependent upon the optically active material employed and the electrode spacing and is generally fixed in a particular design. Unfortunately, parasitic capacitance associated with the varistor material itself is configured so that, after application of a sufficiently large voltage pulse for cell activation, the varistor material and liquid crystal material act as a capacitive voltage divider. This means a lower electric field than could otherwise be provided is being used to maintain the liquid crystal material in its active condition since a certain electric field persists for a time within the varistor material itself. Additionally, if the varistor capacitance is too high, pulses applied to the display could act to turn on nonselected elements in the array. A certain reduction in varistor capacitance is achievable by decreasing the contact area for the electrodes attached to the varistor material and also by increasing the varistor thickness. However, from a practical viewpoint, the varistor electrode area cannot be made too small. Even more importantly, the thickness of the varistor material cannot be increased significantly because the varistor breakdown voltage also increases with the thickness of the material. It thus becomes highly desirable to be able to provide varistor material having intrinsically low capacitance so as to be less reliant upon varistor electrode area and thickness considerations to reduce varistor capacitance.

SUMMARY OF THE INVENTION

In accordance with a preferred embodiment of the present invention, a liquid crystal display includes a slab of unstructured varistor material for exhibiting an intrinsically low capacitance while maintaining its characteristic breakdown voltage. In accordance with the present invention, suitable varistor material is provided by increasing the $Sb_2O_3$ (antimony trioxide) content of conventional zinc oxide based varistor material. The use of $Sb_2O_3$ in increased quantities reduces the varistor capacitance and otherwise enhances the multiplexing capabilities of the display.

Accordingly, it is an object of the present invention to provide a multiplexed liquid crystal display employing improved, low capacitance nonlinear varistor material for the purpose of effecting greater persistence in the "on" state of individual liquid crystal cells to achieve a higher degree of multiplexing.

DETAILED DESCRIPTION OF THE INVENTION

Figure 1A:
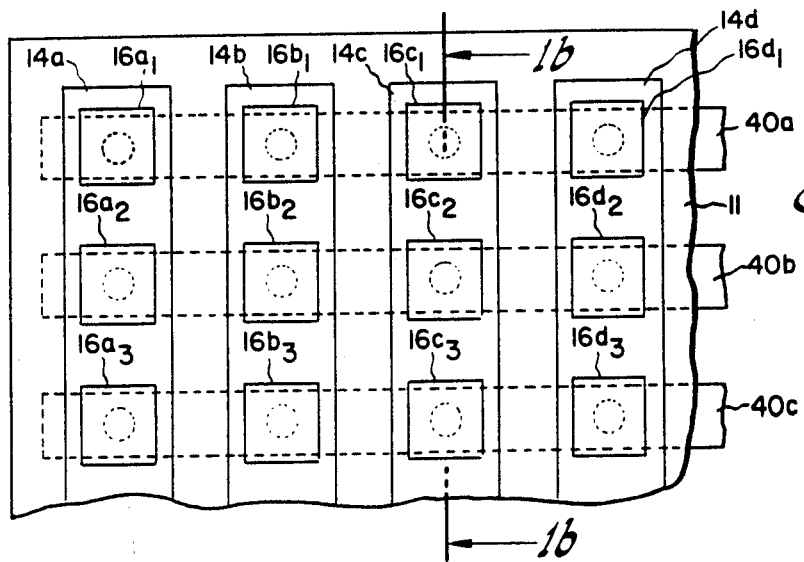
FIG. 1a is a top view of a portion of a liquid crystal display.
Figure 1B:
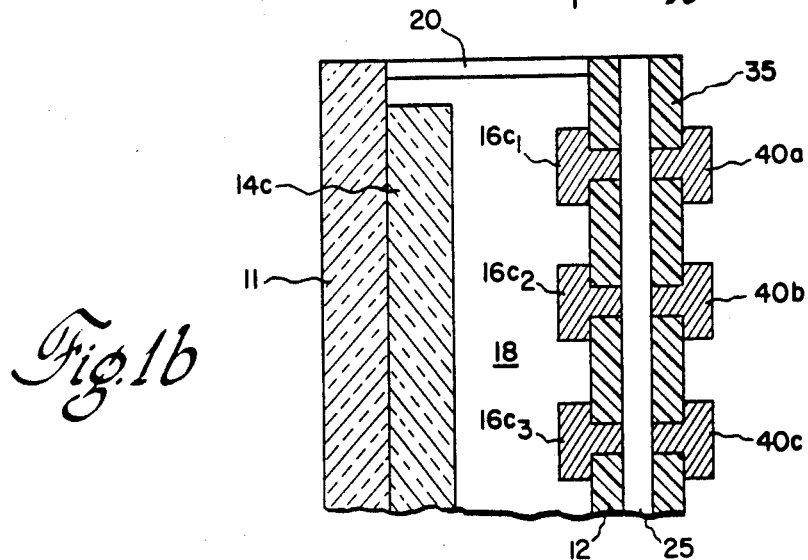
FIG. 1b is a cross section through a portion of FIG. 1a as shown.

In FIG. 1a there is shown a portion of an array of liquid crystal cells forming a display. The view is a top view, the uppermost portion being transparent window 11 typically comprising glass or other suitably transparent inert material. Disposed beneath window 11 are column electrodes 14a, 14b, 14c, and 14d. These column electrodes typically comprise a transparent conductive material such as indium tin oxide or the like and are disposed in an elongated fashion such as that shown. Immediately beneath the column electrodes there is also disposed an optically active substance such as that conventionally described as liquid crystal material. In a particular embodiment of the present invention, the optically active material comprises a cholesteric-nematic liquid crystal host having dissolved therein a guest dichroic. While not visible in FIG. 1a, the optically active material 18 is shown in FIG. 1b and is described in detail below. Below each column electrode 14 there are disposed display electrodes 16 configured in an array fashion. For example, disposed opposite column electrode 14a are display electrodes $16a_1$, $16a_2$, $16a_3$, etc. The combination of the column electrode, a particular display electrode disposed opposite said column electrode and that portion of liquid crystal material disposed between said display and said column electrodes collectively form a single liquid crystal display cell in the array. Each display electrode is electrically connected to a varistor slab 25 through small openings in substrate 12 (see FIG. 1b). Disposed on the opposite side of the varistor slab from the display electrodes are row or scan electrodes 40a, 40b, 40c, etc.

FIG. 1b shows a cross section through FIG. 1a as shown. This figure illustrates several of the elements that are not visible in FIG. 1a. In particular, the relation between transparent window 11 and transparent column electrodes 14 is more clearly shown. The optically active material 18 disposed between column electrodes 14 and display electrodes 16 is clearly indicated in the volume shown, being sealed therein with sealant or sealing member 20. Also shown is insulating substrate 12 having holes disposed therein so as to place electrodes 16 in electrical contact with the varistor slab 25. As discussed in the above Castleberry reference, the areas of these holes in substrate 12 may be controlled to partially affect the selection of varistor capacitance. On the opposite side of the varistor slab from the display electrodes there is disposed an insulating substrate 35 supporting row or scan electrodes 40a, 40b, 40c, etc. These row electrodes 40 may be either in continuous contact with the varistor slab 25 or electrically connected to the varistor material intermittently at the points opposite the display electrodes 16.

Figure 2:
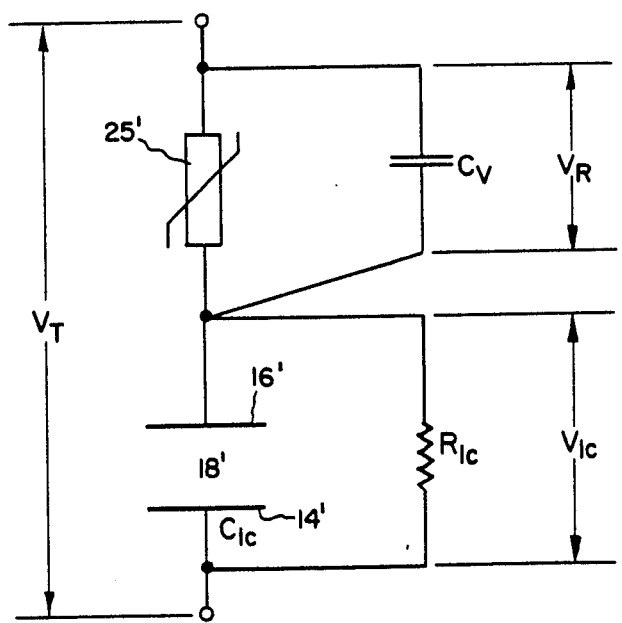
FIG. 2 is an equivalent circuit representation of an individual cell in the display.

FIG. 2 illustrates an equivalent circuit model for a single display cell. Each cell is modeled as a series connection of a varistor 25' in series with capacitor $C_{1c}$ in which lower plate 14' of the capacitor corresponds to column electrode material, upper plate 16' of the capacitor corresponds to a display electrode, and dielectric material 18' between the plates corresponds to optically active material 18. Unfortunately, associated with each capacitive element $C_{1c}$ there is leakage resistance $R_{1c}$ connected across the capacitor. Also there is a parasitic capacitance $C_v$ associated with the varistor material 25 and similarly connected across said varistor as shown in FIG. 2. At a certain voltage level $V_b$ the varistor 25' conducts, and beyond a certain voltage $V_{on}$, between the display electrode and the column electrode, the optically active material changes its transmissivity. Thus, when voltage $V_T$, as shown in FIG. 2, exceeds the sum $V_b + V_{on}$, the display element activates. Short voltage pulses whose amplitude exceeds $V_b + V_{on}$ momentarily drive the varistor to a conducting state during which energy is stored in the form of an electric field in capacitor $C_{1c}$. The varistor material is excellent for this application since following termination of a voltage pulse, the varistor returns to its normal nonconducting state thereby inhibiting the removal of energy from $C_{1c}$ and the optically concomitant loss of contrast in the image displayed. However, a certain degradation in the display occurs because of the presence of the leakage resistance $R_{1c}$, but nonetheless the degradation in the image would occur much faster if varistor 25' did not re-enter a nonconducting state. Unfortunately, there is also associated with varistor 25' a parasitic capacitance $C_v$ inherent in the material. The presence of this parasitic capacitance adversely affects the performance of the display. In particular, because of the presence of the parasitic capacitance, the energy present in the pulse applied to the cell is divided unnecessarily between the varistor and the otpically active material. Thus, in a matrix driven display the parasitic capacitance $C_v$, if sufficiently large, can cause partial selection of undesired cell array positions causing a decrease in display contrast.

Figure 3:
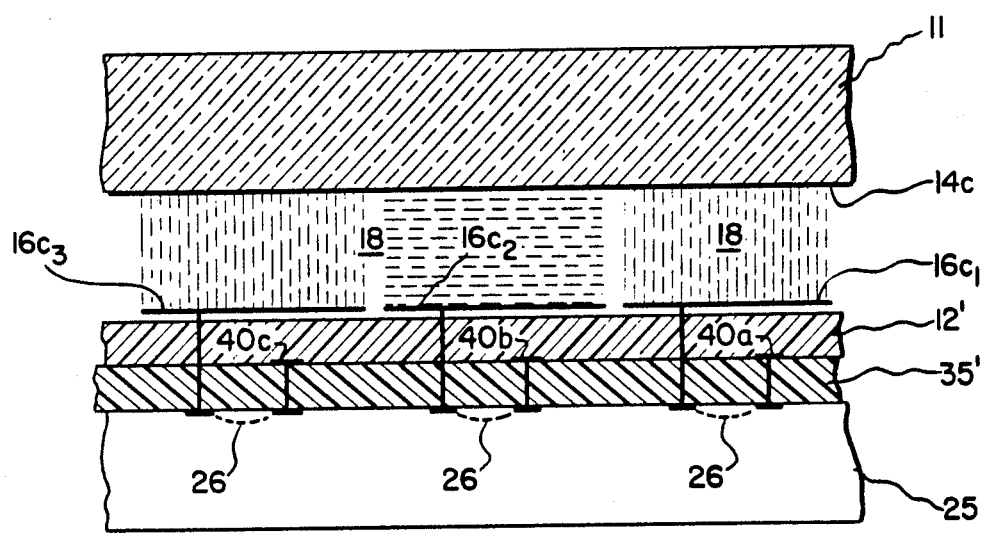
FIG. 3 is an alternate embodiment of the display shown in FIG. 1

An alternative embodiment of the display of FIG. 1 is shown in FIG. 3 indicating that a slab of varistor material may be employed in liquid display configurations in which the conduction through the varistor material occurs between electrodes on the same side of the slab of varistor material rather than between electrodes disposed on the opposite sides of the slab as shown in FIG. 1. As in FIG. 1, the liquid crystal display includes a transparent glass member 11 coated with a conducting column electrode 14c. Between the column electrode 14c and the display electrode $16c_1$, $16c_2$, and $16c_3$ as shown there is disposed liquid crystal material 18 in various light transmissivity states. The display electrodes $16c_1$–$16c_3$, etc., are electrically connected through insulating layers 12' and 35' to the slab of varistor material 25. Likewise, row electrodes 40a–40c, etc., are disposed between insulating layers 12' and 35' and are oriented in a direction substantially transverse to the orientation of the column electrodes 14. The row electrodes are similarly connected through insulating layer 35' to the same side of the varistor slab 25 as the display electrodes and are connected to the slab in the same vicinity as are the corresponding display electrodes. Accordingly, varistor breakdown action occurs between the closer spaced electrodes and current flows as indicated by the flow lines 26 between the relatively adjacent electrodes on the same side of the varistor slab 25. This particular embodiment is advantageous in that it permits at least some control of the varistor capacitance through the spacing of these adjacent electrodes rather than through controlling the thickness of the varistor slab.

In accordance with the present invention, the varistor parasitic capacitance $C_v$ is reduced by including in the varistor mix between approximately 2 mole percent and 8 mole percent antimony trioxide ($Sb_2O_3$). Other metal oxide additives, such as those found in conventional varistor mixes, may also be included. The exact proportions of the other metal oxides to the quantity of $Sb_2O_3$ employed are not critical to the invention. It is, however, desirable that of the mole percentage of $Sb_2O_3$ in the varistor mix be greater than twice as large as the mole percentage of bismuth trioxide ($Bi_2O_3$). In the preferred embodiment, the mole percentage of $Sb_2O_3$ to the mole percentage of $Bi_2O_3$ is in the ratio of 4:1. The mole percentage of each of the other additives such as $Co_2O_3$, $MnO_2$, $NiO$, $Cr_2O_3$, $BaCO_3$, and $H_3BO_3$ may be kept below 2 mole percent. Varistors fabricated in accordance with the invention exhibit lower capacitance but are not constrained to have an increased breakdown field $F_1$. By way of example, and not limitation, the varistor mix from which the varistor slab may be sintered may comprise the following approximate composition: 0.5 mole percent $Bi_2O_3$, 0.5 mole percent $Co_2O_3$, 0.5 mole percent $MnO_2$, 0.5 mole percent $Cr_2O_3$, 1 mole percent $NiO$, 0.2 mole percent $H_3BO_3$, 0.1 mole percent $BaCO_3$, between 2 and 8 mole percent $Sb_2O_3$, and the remainder being at least 88.7 mole percent $ZnO$. These varistor compositions may be effectively employed in a liquid crystal display, such as that illustrated in FIGS. 1a and 1b, to enhance its performance.

The significance of reducing the parasitic capacitance by increasing the mole percentage of $Sb_2O_3$ can be better appreciated through an understanding of the varistor capacitance as a function of varistor geometric and physical parameters. In particular, if $C_{var}$ is the varistor capacitance, $C_{var} = \epsilon\epsilon_o A/d$, where A is the area of varistor, d is the thickness of the varistor slab, $\epsilon_o$ is the permitivity of free space, and $\epsilon$ is the effective dielectric constant of the varistor material. Additionally, given that $V_1 = F_1 d$, where $V_1$ is the varistor breakdown voltage and $F_1$ is the varistor breakdown electric field, it is easily seen that $C_{var} = \epsilon F_1(\epsilon_o A/V_1)$. Since the quantity $\epsilon_o(A/V_1)$ is fixed by circuit parameters of the liquid crystal display, in order to produce varistors having a lower capacitance, it is necessary to reduce the product $\epsilon F_1$. The reduction in $\epsilon F_1$ is accomplished by increasing the antimony content of the varistor manufacturing mix.

The $\epsilon F_1$ product of conventional varistor materials is approximately constant or varies only slightly for a wide range of varistor compositions. However, the varistor material in accordance with the present invention exhibits values of the $\epsilon F_1$ product which decrease with increasing amounts of $Sb_2O_3$ as shown in the table.

TABLE

| $Sb_2O_3$ Content (Mole Percent) | $\epsilon F_1 \times 10^{-6}$ (volts/cm) |
| --- | --- |
| 1.0 | 2.15 |
| 2.0 | 1.14 |
| 5.0 | 0.56 |
| 6.0 | 0.37 |
| 8.0 | 0.26 |
| 10.0 | no varistor breakdown |

A typical value of the $\epsilon F_1$ product for a conventional varistor material is approximately $2 \times 10^{+6}$ volts/cm as indicated in the table by the varistor material containing only 1 mole percent of $Sb_2O_3$. If, however, the quantity of $Sb_2O_3$ is doubled to 2 mole percent, the $\epsilon F_1$ product is $1.14 \times 10^{+6}$ volts/cm, a decrease of over $1 \times 10^{+6}$ volts/cm from the value associated with conventional varistor compositions. Even greater reduction in the $\epsilon F_1$ product can be achieved if the quantity of $Sb_2O_3$ is increased to approximately 8 mole percent. It is important to note that at 10 mole percent $Sb_2O_3$, the material is insulating and does not exhibit a varistor voltage breakdown.

It is known that a conventional varistor material comprises grains separated by layers of insulating intergranular material. The increased $Sb_2O_3$ content promotes the formation of additional insulating material, Zn-Sb spinel, in the region between the zinc oxide grains, thereby reducing the $\epsilon F_1$ product. Other materials which are capable of producing intergranular insulating material, may also be used to decrease the $\epsilon F_1$ product. Silicon dioxide ($SiO_2$) and magnesium oxide ($MgO$) are examples of such materials. Magnesium oxide, for example, promotes the formation of Mg-Zn spinel.

While certain preferred features of the invention have been shown by way of illustration, many modifications and changes will occur to those skilled in the art. It is, therefore, to be understood that the appended claims are intended to cover all such modifications and changes as fall within the true spirit of the invention.

The invention claimed is:

1. In a multiplexible matrix display including a plurality, N, of elongated, non-intersecting column electrodes and an N×M array of reflective display electrodes arranged behind and in registration with said column electrodes and further including a layer of optically active material display electrodes, said optically active material having a light transmissivity dependent on the voltage between said column and said display electrodes, each of said display electrodes being adjacent and connected to a first portion of a slab of nonlinear zinc oxide based varistor material comprising zinc oxide grains separated by layers of insulating intergranular material, a second portion of said slab having disposed thereon in electrical contact therewith M elongated, non-intersecting row electrodes extending in a direction substantially transverse to said column electrodes and further being in registration with said display electrodes, said varistor material exhibiting a dielectric constant $\epsilon$ and a breakdown field, $F_1$; the improvement in which:

said varistor material consists of between 2 mole percent and 8 mole percent $Sb_2O_3$, a quantity of $Bi_2O_3$ selected so that the mole percentage of $Sb_2O_3$ is more than twice the mole percentage of $Bi_2O_3$, at least one other material selected from the group consisting of $Co_2O_3$, $MnO_2$, $NiO$, $Cr_2O_3$, $BaCO_3$ and $H_3BO_3$ and the balance being $ZnO$.

2. The matrix display of claim 1 wherein the product $\epsilon F_1$ is at most $1.14 \times 10^{+6}$ volts/cm.

3. The matrix display of claim 1 wherein said varistor material comprises $Sb_2O_3$ and $Bi_2O_3$ in a 4:1 mole percent ratio.

4. The matrix display of claim 1 wherein the mole percentage of each of said materials other than $Sb_2O_3$ and $ZnO$ is less than 2 mole percent of the total molar percentage of said varistor material.

5. The matrix display of claim 1 in which said varistor slab comprises approximately 0.5 mole percent $Bi_2O_3$, 0.5 mole percent $Co_2O_3$, 0.5 mole percent $MnO_2$, 1 mole percent $NiO$, 0.5 mole percent $Cr_2O_3$, 0.1 mole percent $BaCO_3$, 0.2 mole percent $H_3BO_3$, between 2 mole percent and 8 mole percent $Sb_2O_3$, the balance being $ZnO$.

6. In a multiplexible matrix display including a plurality, N, of elongated, non-intersecting column electrodes and an N×M array of reflective display electrodes arranged behind and in registration with said column electrodes and further including a layer of optically active mterial disposed between said column electrodes and said display electrodes, said optically active material having a light transmissivity dependent on the voltage between said column and said display electrodes, said optically active material having a light transmissivity dependent on the voltage between said column and said display electrodes, each of said display electrodes being adjacent and connected to a first portion of a slab of nonlinear zinc oxide based varistor material comprising zinc oxide grains separated by layers of insulating intergranular material, a second portion of said slab having disposed thereon in electrical contact therewith M elongated, non-intersecting row electrodes extending in a direction substantially transverse to said column electrodes and further being in registration with said display electrodes, said varistor material exhibiting a dielectric constant $\epsilon$ and a breakdown field, $F_1$; the improvement in which:

said varistor material consisting of between 2 mole percent and 8 mole percent $Sb_2O_3$, a quantity of $Bi_2O_3$ selected so that the mole percentage of $Sb_2O_3$ is more than twice the mole percentage of $Bi_2O_3$, at least one other material selected from the group consisting of $Co_2O_3$, $MnO_2$, NiO, $Cr_2O_3$, $BaCO_3$ and $H_3BO_3$ and at least 88.7 mole percent ZnO.

7. The matrix display of claim 6 in which the mole percentage of each of said metal oxides other than $Sb_2O_3$ and ZnO is less than 2 mole percent of the total molar percentage.

8. The matrix display of claim 6 wherein said varistor material comprises $Sb_2O_3$ and $Bi_2O_3$ in a 4:1 mole percent ratio.

9. The matrix display of claim 6 wherein the product $\epsilon F_1$ is at most $1.14 \times 10^{+6}$ volts/cm.

* * * * *